Nov. 17, 1925.
F. BISHOP
1,561,823
LAWN EDGING ATTACHMENT
Filed June 23, 1924
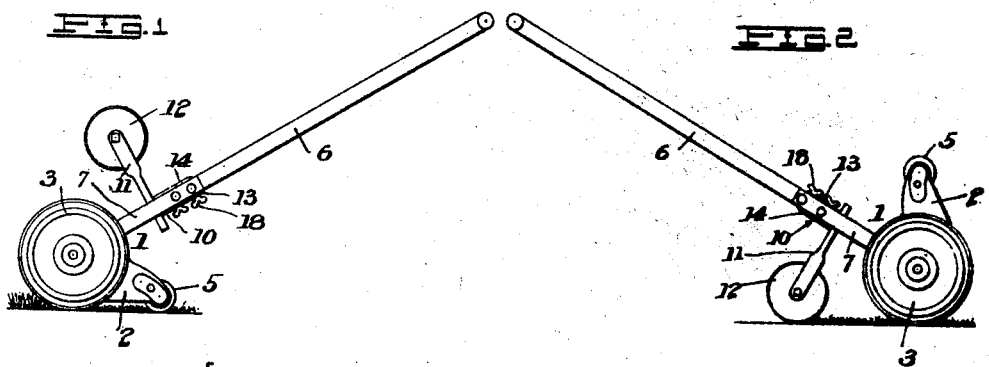
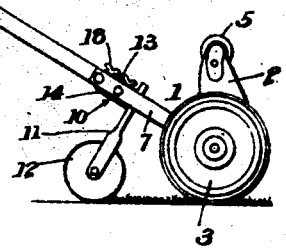
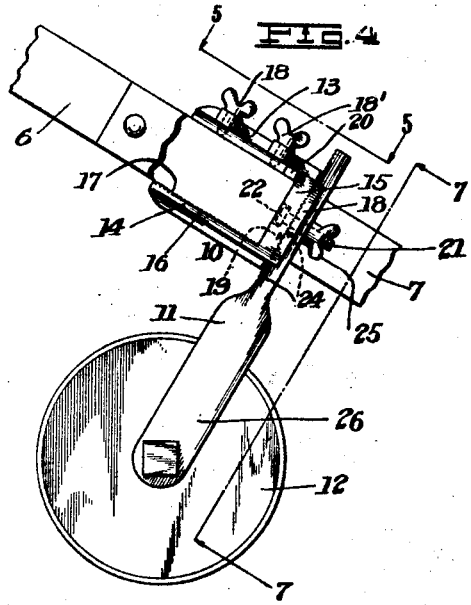
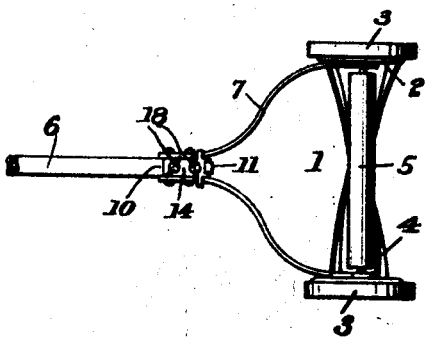
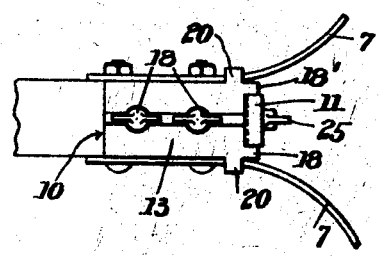
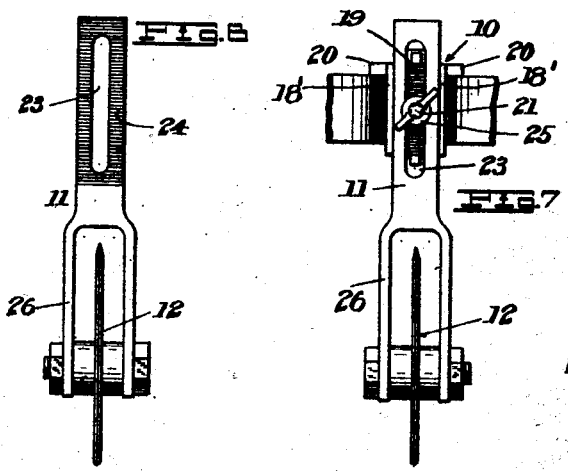
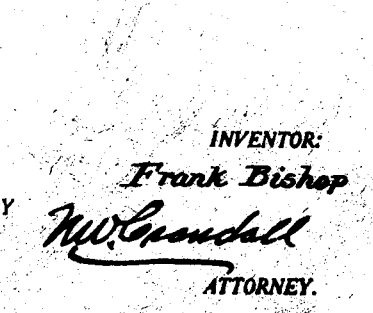
INVENTOR:
Frank Bishop
BY
ATTORNEY.

Patented Nov. 17, 1925.

1,561,823

UNITED STATES PATENT OFFICE.

FRANK BISHOP, OF LOS ANGELES, CALIFORNIA.

LAWN-EDGING ATTACHMENT.

Application filed June 23, 1924. Serial No. 721,893.

*To all whom it may concern:*

Be it known that I, FRANK BISHOP, a citizen of the United States, residing at Los Angeles, in the county of Los Angeles and State of California, have invented certain new and useful Improvements in Lawn-Edging Attachments, of which the following is a specification.

My invention relates to lawn edging tools and more particularly to lawn edging attachments for lawn mowers.

The general object of my invention is to provide a lawn edging attachment which may be attached to the lower end of the handle of a lawn mower, between the handle bails, in such manner that the attachment will be in a position out of operation when the mower is in mowing position, and will be brought into operative position into contact with the lawn when the handle of the mower is swung over to a reversed position on the opposite side of the mower.

A more particular object is to provide an attachment of the character stated including means for adjusting the attachment cutter transversely with relation to the lawn mower handle so that the handle may be held high or low.

Other objects and advantages will appear hereinafter and while I disclose herein a preferred form of construction, I do not limit my invention to such form because it may be embodied in other forms and it is to be understood that in and by the claims of this specification I intend to cover my invention in whatever form it may be embodied.

Referring to the annexed drawing which forms a part of this specification

Fig. 1 is a side view of a lawn mower with my attachment applied thereto, the lawn mower being shown in mowing position, and my attachment being in inoperative position.

Fig. 2 is a side view of said lawn mower with the handle thereof and my attachment swung over to the other side and the cutter of my attachment in operative position in contact with the lawn.

Fig. 3 is a plan view of the lawn mower and my attachment.

Fig. 4 is an enlarged side view of my attachment applied to the lower end of the handle of the lawn mower, a portion only of the lawn mower handle being shown.

Fig. 5 is a plan view of my attachment and the portion of the lawn mower to which the attachment is applied, as seen from the direction indicated by the arrow of line 5—5 of Fig. 4.

Fig. 6 is an enlarged rear view of the cutter support and cutter of my attachment.

Fig. 7 is an enlarged front view of my edging attachment as seen from the direction indicated by the arrows of line 7—7 of Fig. 4.

In the drawing 1 indicates a lawn mower comprising in general a frame 2, traction wheels 3, rotary cutter 4, roller 5, handle 6, and handle connecting bails 7 which connect the lower end of the handle to the frame 2.

My attachment comprises a U-shaped clamp 10, an adjustable colter support 11, and a rotary disk cutter 12.

The clamp 10 comprises a pair of arms 13 and 14 and a cross bar 15 connecting said arms at their lower end. The clamp fits on the lower end of the lawn mower handle 6 between the bails 7, the arms 13 and 14 engaging the lower and upper sides respectively of the handle and the cross bar 15 engaging the lower end of the handle. The inner side of the arm 14 is formed with serrations 16 for engaging serrations 17 on the upper side of the handle 6. Set screws 18 are seated in the arm 13 for engaging the lower side of the handle to draw the arm 14 against the upper side of the handle and the serrations 16 into engagement with the serrations 17, thus firmly positioning the clamp 10 on the lower end of the handle. Forwardly extending flanges 18' are formed along the side edges of the cross bar 15 and the outer face of said cross bar is formed with horizontal serrations 19. Lugs 20 are formed on the side edges of the clamp arm 13, which lugs engage the lower edges of the handle bails 7. A bolt 21 is seated in the cross bar 15 at 22 and extends forwardly from said bar through a vertical slot 23 in the shank of the support 11, which is fitted against the outer side of the cross bar 15 between the flanges 18', there being horizontal serrations 24 on the rear side of said shank which engage the serrations 19 on said cross bar under the influence of a nut 25 which screws on the forward end of the bolt 21 against the forward side of said shank, thus detachably and adjustably securing the colter support 11 on the clamp 10. The lower part of the support 11 is formed with a bifurcation 26 and at its extremities is journaled the rotary disc colter 12.

When mowing and while the mower is in mowing position the colter 12 is elevated above the handle 6 out of operation as shown in Fig. 1. Upon swinging the handle 6 over to the rear side the roller 5 is elevated off the lawn while the colter 12 is brought into contact with the lawn for edging the lawn upon pushing the mower as shown in Fig. 2.

Upon loosening the nut 25 the support 11 may be adjusted up or down on the clamp 10 and secured in such adjusted position upon again tightening the nut so that the colter 12 may be adjusted to edge the lawn when the handle 6 is positioned high or low or between such extreme positions. The lugs 20 serve to prevent downward pulling of the clamp off the lower end of handle 6.

I claim as my invention:

1. In combination; a U-clamp adapted for engaging the lower extremity of a lawn mower handle between the bails thereof; a bifurcated colter support having a shank adjustably attached to the cross bar of said clamp; and a disk colter journalled between the extremities of said bifurcations.

2. In combination; a U-clamp adapted for engaging the lower extremity of a lawn mower handle between the bails thereof, the cross bar of said clamp having a serrated outer face with bolt projecting therefrom; a bifurcated colter support having a longitudinally slotted shank with a serrated face adapted for longitudinally adjustable attachment to said cross bar by means of said bolt; and a disk colter journalled between the extremities of said bifurcations.

3. In combination; a U-clamp having a serrated clamping surface adapted for engaging the lower end of a lawn mower handle between the bails thereof, and a cross bar with a serrated outer face and a bolt projecting therefrom; a bifurcated colter support having a longitudinally slotted shank with a serrated face, adapted for engaging the serrations of the cross bar and for being longitudinally positionable thereon by means of said bolt and slot; and a disk colter journalled between the extremities of said bifurcations; said cross bar having side flanges adapted for engaging the respective edges of said shank.

FRANK BISHOP.